United States Patent
de Jong

(10) Patent No.: US 10,206,463 B2
(45) Date of Patent: Feb. 19, 2019

(54) MAGNETIC WRISTBAND

(71) Applicant: Apple Inc., Cupertino, CA (US)

(72) Inventor: Erik G. de Jong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/771,563

(22) PCT Filed: Mar. 10, 2014

(86) PCT No.: PCT/US2014/022651
§ 371 (c)(1),
(2) Date: Aug. 31, 2015

(87) PCT Pub. No.: WO2014/150231
PCT Pub. Date: Sep. 25, 2014

(65) Prior Publication Data
US 2016/0007697 A1    Jan. 14, 2016

Related U.S. Application Data

(60) Provisional application No. 61/800,041, filed on Mar. 15, 2013.

(51) Int. Cl.
*H01F 7/02* (2006.01)
*A44C 5/20* (2006.01)
(Continued)

(52) U.S. Cl.
CPC .............. *A44C 5/2071* (2013.01); *F16B 1/00* (2013.01); *G06F 1/163* (2013.01); *G06F 1/1637* (2013.01);
(Continued)

(58) Field of Classification Search
CPC .......................... Y10T 24/32; A44D 2203/00
(Continued)

(56) References Cited

U.S. PATENT DOCUMENTS 1,692,079 A   11/1928 D'Alo
4,197,618 A * 4/1980 Bourguignon .......... A41F 1/002
                                                      24/303
(Continued)

FOREIGN PATENT DOCUMENTS

CN          2862782      1/2007
CN         201683167    12/2010
(Continued)

OTHER PUBLICATIONS

International Search Report and Written Opinion, PCT/US2014/022651, 13 pages, dated Jul. 7, 2014.
(Continued)

*Primary Examiner* — Alexander Talpalatski
(74) *Attorney, Agent, or Firm* — Morgan, Lewis & Bockius LLP

(57) ABSTRACT

This application relates generally to various embodiments of a magnetic wristband. More specifically the application describes a design for a magnetic wristband having a number of configurations. In one configuration the wristband is magnetically coupled around a user's wrist. In another configuration the magnetic wristband can be magnetically coupled around an electronic device to which it is attached. In this second described configuration the magnetic wristband acts as a protective cover for the electronic device to which the wristband is attached. In this way a user can reduce the likelihood of damage being inflicted upon the electronic device while it is not being worn.

16 Claims, 13 Drawing Sheets

(51) Int. Cl.
*F16B 1/00* (2006.01)
*G06F 1/16* (2006.01)
*A44C 5/00* (2006.01)
*A44C 5/16* (2006.01)

(52) U.S. Cl.
CPC .......... *G06F 1/1662* (2013.01); *A44C 5/0007* (2013.01); *A44C 5/16* (2013.01); *A44D 2203/00* (2013.01); *F16B 2001/0035* (2013.01)

(58) Field of Classification Search
USPC ............................................ 335/306; 24/303
See application file for complete search history.

(56) References Cited

U.S. PATENT DOCUMENTS

| | | | | |
|---|---|---|---|---|
| 4,941,236 | A * | 7/1990 | Sherman | A44C 5/2071 24/265 WS |
| 6,301,754 | B1 * | 10/2001 | Grunberger | A41F 1/02 24/303 |
| 6,799,887 | B1 | 10/2004 | Kinney | |
| 7,363,687 | B2 * | 4/2008 | Kraus | A44C 5/14 24/303 |
| 7,562,640 | B2 | 7/2009 | Lalor | |
| 7,690,220 | B2 * | 4/2010 | Okamura | A44C 15/005 446/129 |
| 8,769,844 | B2 | 7/2014 | Beers et al. | |
| 8,787,006 | B2 * | 7/2014 | Golko | G06F 1/163 361/679.03 |
| 8,997,318 | B2 * | 4/2015 | Nicolas | A44C 5/04 24/265 WS |
| 9,298,882 | B2 * | 3/2016 | Proud | H02J 7/025 |
| 2003/0229974 | A1 | 12/2003 | Zemer et al. | |
| 2006/0196021 | A1 * | 9/2006 | Touzov | A43B 1/0054 24/712 |
| 2007/0167106 | A1 * | 7/2007 | Hoover | A41F 1/002 446/26 |
| 2008/0184737 | A1 * | 8/2008 | Wiseman | A44C 11/002 63/3.1 |
| 2008/0256979 | A1 * | 10/2008 | Okamura | A44C 5/2071 63/3.1 |
| 2009/0010110 | A1 | 1/2009 | Chariton | |
| 2011/0003665 | A1 * | 1/2011 | Burton | G04F 10/00 482/9 |
| 2012/0044031 | A1 | 2/2012 | Ninomiya et al. | |
| 2013/0205476 | A1 * | 8/2013 | Gentile | A41F 1/08 2/311 |
| 2013/0326790 | A1 * | 12/2013 | Cauwels | A44C 5/2071 2/170 |
| 2014/0000312 | A1 * | 1/2014 | Nicolas | A44C 5/04 63/3.2 |
| 2017/0086535 | A1 | 3/2017 | de Iuliis et al. | |

FOREIGN PATENT DOCUMENTS

| | | |
|---|---|---|
| CN | 201846934 | 6/2011 |
| CN | 201869909 | 6/2011 |
| CN | 202233407 | 5/2012 |
| CN | 102488365 | 6/2012 |
| JP | S59186504 | 3/2007 |
| JP | 2010207411 | 9/2010 |
| KR | 20-0420882 | 7/2006 |
| KR | 20042088200 | 7/2006 |
| KR | 20-0428786 Y1 | 10/2006 |
| KR | 20080000609 | 4/2008 |
| WO | WO2012/160195 | 11/2012 |

OTHER PUBLICATIONS

Korean Office Action from Korean Patent Application No. 10-2015-7023054, dated Mar. 31, 2017.
Korean Office Action from Korean Patent Application No. 10-2017-7018396, dated Apr. 11, 2018, 21 pages.

* cited by examiner

MAGNETIC WRISTBAND

CROSS-REFERENCE TO RELATED APPLICATIONS

This application is a 35 U.S.C. § 371 application of PCT/US2014/022651, filed Mar. 10, 2014 and titled "Magnetic Wristband," which claims priority to U.S. Provisional Patent Application No. 61/800,041, filed Mar. 15, 2013 and titled "Magnetic Wristband," the disclosures of which are hereby incorporated by reference herein in their entireties.

BACKGROUND

Technical Field

The described embodiments relate generally to a magnetic wristband. The application relates more specifically to a magnetic wristband operable to both secure a device to a wrist in one configuration and to protect that device while it is not being worn in another configuration.

Related Art

Wristwatches generally include a housing having a display with a transparent cover disposed over a display that provides among other things time of day information to a user. Common display covers include glass, mineral glass crystal, sapphire or even diamond. In many cases a user may wish to remove a wristwatch and place it in a bag or storage container until a later time. Unfortunately, when removed the wristwatch can be subjected to even greater forces and damage than when worn by the user. Unfortunately, removed wristwatch tends to leave the housing and display cover completely unprotected and susceptible to damage. Frequently both a housing portion of the wristwatch and the display cover can be susceptible to scratching, dings and even cracks, when for example the housing is made from a vulnerable material such as aluminum or stainless steel. Certain types of finishes of the housing can also change the susceptibility of the housing to damage. For example, an aluminum housing with a sandblasted finish can be more likely to incur cosmetic or functional damage than an aluminum housing with an anodized and/or polished surface. Furthermore, custom protective watch bags and cases can be quite expensive and even inconvenient when a user simply wants to put the wristwatch down.

Such may not provide a convenient way for a user to protect a housing and display cover of a wristwatch or wrist-mountable device without having to store an extra piece of gear.

SUMMARY

This paper describes various embodiments that relate to a magnetic wristband having at least two wrapping configurations.

In a first embodiment a magnetic wristband is disclosed. The magnetic wristband may include at least the following: (1) a first wrist strap having a first end mechanically coupled to a first end of an object, the first wrist strap possibly including at least the following: a first surface, a second surface opposite the first surface, and a first group of magnets disposed between the first and second surface in accordance with a first polarity pattern; and (2) a second wrist strap having a first end mechanically coupled to a second end of the object, the second wrist strap possibly including at least: a first surface, a second surface opposite the first surface, and a second group of magnets disposed between the first and second surface in accordance with a second polarity pattern. In a first wrapping configuration the first wrist strap may be magnetically coupled concurrently to both the first and second surface of the second wrist strap, and in a second wrapping configuration the first wrist strap may be magnetically coupled only to the first surface of the second wrist strap.

In another embodiment an electronic device is disclosed. The electronic device may include at least the following: (1) a housing having a first end and second end, the second end opposite the first end; (2) a display; (3) a user interface; and (4) a magnetic wristband. The magnetic wristband may include at least the following: (1) a first wrist strap having a first end mechanically coupled to the first end of the housing, the first wrist strap possibly including: a first surface, a second surface opposite the first surface, and a first group of magnets disposed between the first and second surface in accordance with a first polarity pattern; and (2) a second wrist strap having a first end mechanically coupled to the second end of the housing, the second wrist strap possibly including: a first surface, a second surface opposite the first surface, and a second set of magnets disposed between the first and second surface in accordance with a second polarity pattern. In a first wrapping configuration the first wrist strap may be magnetically coupled concurrently to both the first and second surface of the second wrist strap, and in a second wrapping configuration the first wrist strap may be magnetically coupled only to the first surface of the second wrist strap.

In yet another embodiment a magnetic wristband is disclosed. The magnetic wristband may include at least the following: (1) a first wrist strap having a first end rotatably coupled to a first end of an object, the first wrist strap possibly including at least the following: a first surface, a second surface opposite the first surface, and a number of magnetically attractable elements disposed between the first and second surface; and (2) a second wrist strap having a first end rotatably coupled to a second end of the object, the second wrist strap possibly including at least the following: a first surface, a second surface opposite the first surface, and a number of magnets disposed between the first and second surface in accordance with a polarity pattern. In a first wrapping configuration the first wrist strap may be magnetically coupled concurrently to both the first and second surface of the second wrist strap, and in a second wrapping configuration the first wrist strap may be magnetically coupled only to the first surface of the second wrist strap.

Other aspects and advantages of the disclosure will become apparent from the following detailed description taken in conjunction with the accompanying drawings which illustrate, by way of example, the principles of the described embodiments.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION OF SELECTED EMBODIMENTS

Figure 1A:
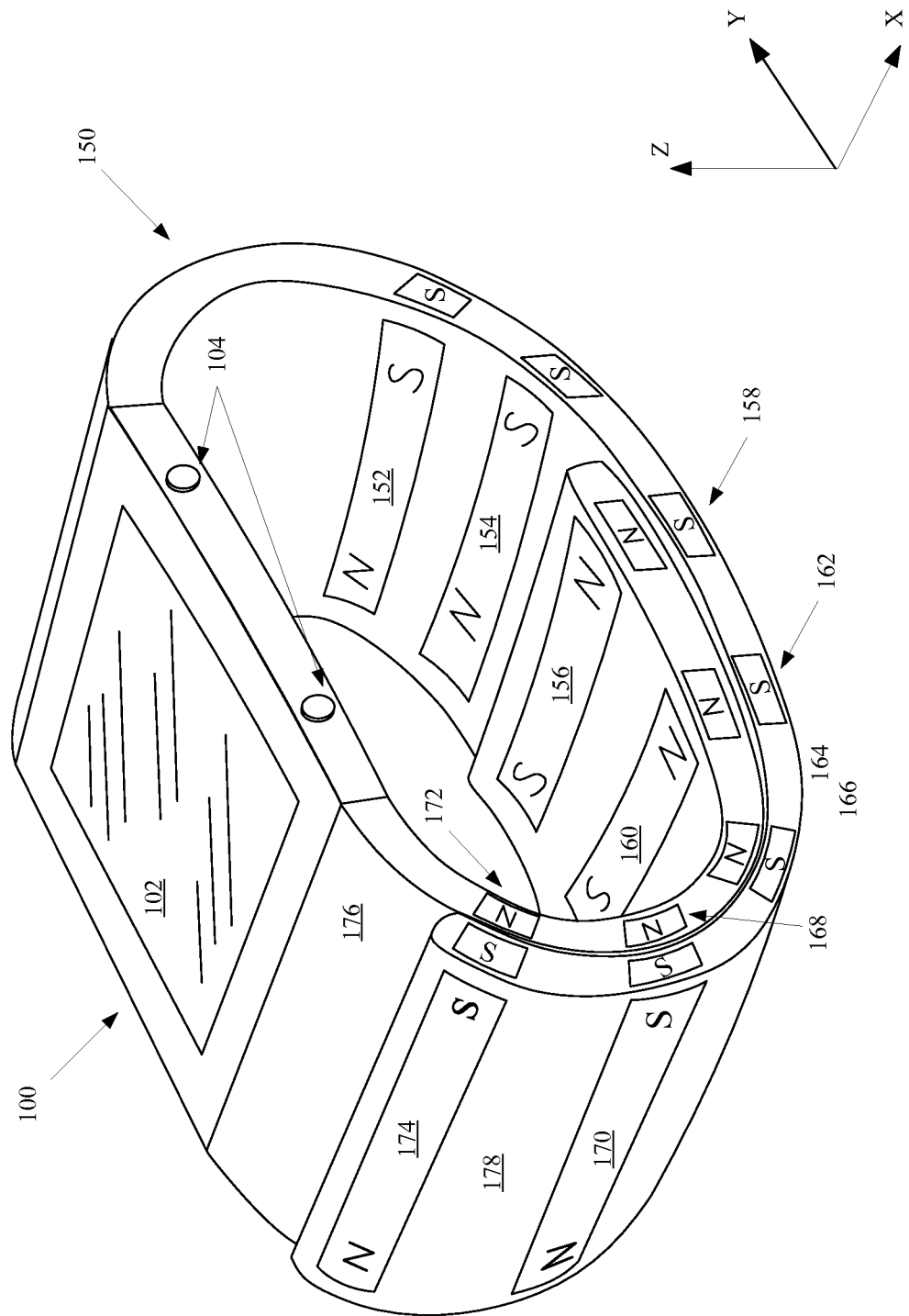
FIG. 1A shows a perspective view of a wrist-mountable electronic device configured with a magnetic wristband.

Representative applications of an apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Wristbands for wristwatches have traditionally served a single purpose of securing a watch to a user's wrist. In many cases the wristbands, especially in the case of many metal and plastic wristbands, tend to cause a display portion and portion of the housing of the wristwatch to be disposed in an outward facing manner, thereby putting the device in a vulnerable position. One solution that can provide protection for a wristwatch, or any other similarly configured device is a magnetic wristband having at least two configurations. In a first wrapping configuration the magnetic wristband can be attached to a user's wrist while in a second wrapping configuration the wristband can be wrapped around the device such that both an upper and lower surface of the device are substantially protected from damage while the device is not being worn. The first wrapping configuration is achieved by wrapping the wristband made up of two wrist straps around a user's wrist. Since the wrist straps include a number of magnets arranged with magnetic polarity patterns that are complementary to one another, the wrist straps become magnetically coupled around a user's wrist once they come in close proximity to one another. The second wrapping configuration is achieved by rotating a first strap of the wristband around a lower surface of the device and rotating a second strap of the wristband around an upper surface of the device. By continuing to rotate the first and second straps around the device a protective layer is formed around the device. As the wrist straps are wrapped on top of one another the magnetic fields of the two wrist straps are attracted to one another and firmly secure the wrist straps together in a protective configuration. When the wristband is made of a softer material than the housing and display portions of the device, such as for example fabric or leather the wristband itself can provide protection without posing any danger of causing damage to the device itself.

Various embodiments of a wristband suitable for use with a wrist-mountable device are discussed below with reference to FIGS. 1A-6. However, those skilled in the art will readily appreciate that the detailed description given herein with respect to these figures is for explanatory purposes as the full extent of the embodiments goes beyond these limited descriptions.

FIG. 1A shows a perspective view of wrist-mountable device 100 configured with magnetic wristband 150. Wrist-mountable device 100 can include display 102. Display 102 can be configured to provide information to a user. In some embodiments device 100 generates information displayed by display 102 while in other embodiments device 100 can be configured to display information on display 102 that is wirelessly transmitted from another device. In one more specific embodiment wrist-mountable device 100 can be utilized to display notifications from another device with which it is in communication. The notification can be displayed visually through display 102 or alternatively through a vibration element disposed within a housing of wrist-mountable device 100. In yet other embodiments a speaker element can be disposed within wrist-mountable device 100 to provide an auditory indication of an event or status change that a user should be apprised of. Wrist-mountable device 100 can include a number of means for inputting information into wrist-mountable device 100, such as for example buttons 104 or a touch screen sensor disposed across display 102. In this way a user can interact with the wrist-mountable device. Display 102 can include a protective element configured to both protect display components within device 100 and in embodiments where display 102 is touch-enabled to provide a surface across which a user can comfortably provide touch inputs. In some exemplary embodiments the protective element can be made of glass while in other embodiments the protective element can be hard plastic. Still other materials such as transparent crystal, sapphire, or even diamond are also possible.

FIG. 1A as mentioned also includes wristband 150. In some embodiments wristband 150 can be in communication with wrist-mountable device 100, either wirelessly or by a wired link. Wristband 150 includes a number of magnets 152-174 disposed within it. The magnets are arranged within wristband 150 such that magnetic polls emanating from magnets 152-174 are aligned parallel to the X-axis. When magnets are disposed in a fixed X-axis position within wristband 150, wrist straps 176 and 178 are precisely aligned with respect to the X-axis once attached due to the two poll alignment of magnetically coupled magnets. Separation between magnets in each of the wrist straps results in discrete fastening positions in which wrist straps 154 and 156 can attach. By spacing the magnets in this way a size of wristband 150 is unlikely to change during wear when the magnets contained within wristband 150 are sufficiently strong. In one specific embodiments magnets 152-174 can be neodymium magnets. Neodymium magnets provide high attraction forces and can be configured with shaped magnetic fields allowing great variation in attraction between the magnets. Because the magnets are enclosed in a fabric or leather wrist strap 176 and 178, brittleness of the magnets can be overcome as each of the magnets has a protective cover that prevents direct contact between the magnets and provides a cushioning effect as wrist straps 176 and 178 are magnetically coupled. Another advantage of the depicted embodiment is that since each magnet is configured to repel adjacent magnets, neither wrist strap 176 nor wrist strap 178 is susceptible to portions of the strap folding over on itself. For example, were a user to fold wrist strap 176 such that magnets 156 and 160 were in close proximity the two would tend to repel one another due to the orientation of magnets 156 and 160. This prevents a user of device 100 from having to unfold each of wrist straps 176 and 178 prior to wearing the device. It should be noted that in addition to being mountable to a user's wrist or assuming a protective configuration, magnetic wristband 150 can also be used to magnetically couple wrist-mountable device 100 to a magnetically attractable device such as for example a surface of a refrigerator.

Figure 1B:
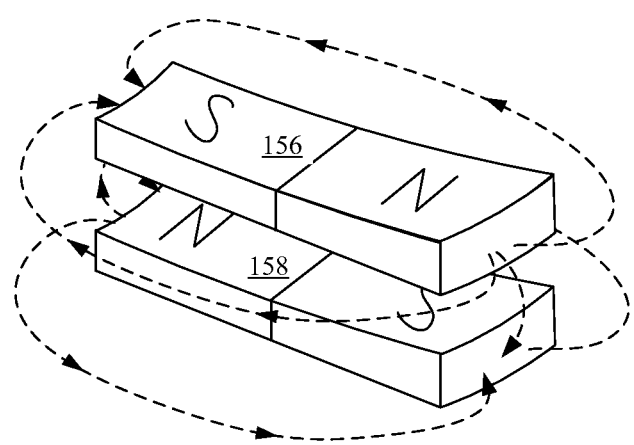
FIG. 1B shows a perspective view of magnetic fields emanating from two magnets suitable for use within a magnetic wristband.
Figure 1C:
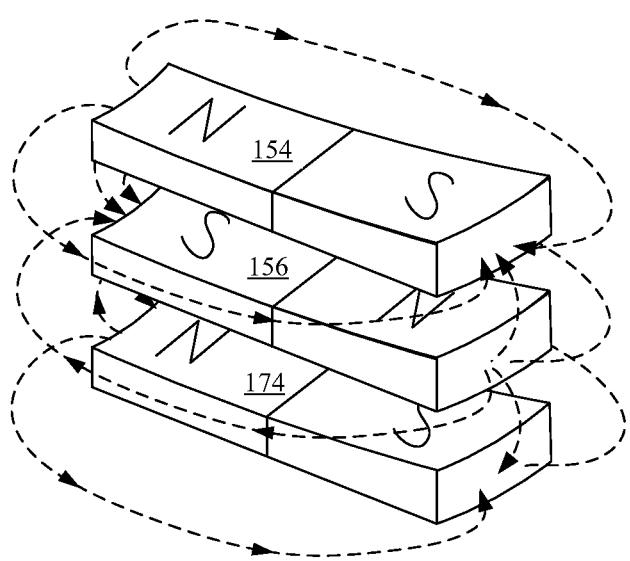
FIG. 1C shows a perspective view of magnetic fields emanating from three magnets suitable for use within a magnetic wristband.

FIG. 1B illustrates a perspective view of magnetic fields emanating from two magnets suitable for use within magnetic wrist straps 176 and 178. In this view the wrist straps have been removed to more clearly illustrate magnetic field lines between magnets 156 and 158. Since the polls are arranged opposite one another the field lines from each of magnets 156 and 158 cooperate and a strong attractive force between the magnets results. FIG. 1C shows magnetic fields for three vertically stacked magnets. Given alternating polarities as depicted all three magnets can be attracted together in a vertical stack configuration. Subsequent figures will depict why this is beneficial when the magnetic wristband assumes a protective configuration.

Figure 2A:
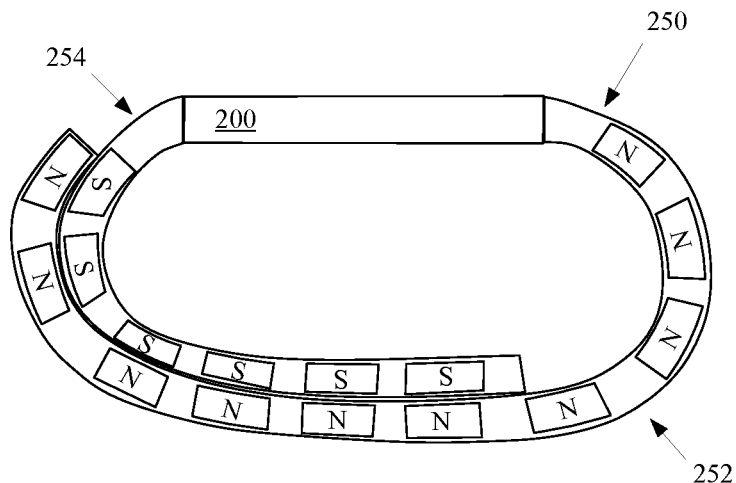
FIGS. 2A-2D show cross sectional views of a wrist-mountable device and an associated wristband.
Figure 2B:
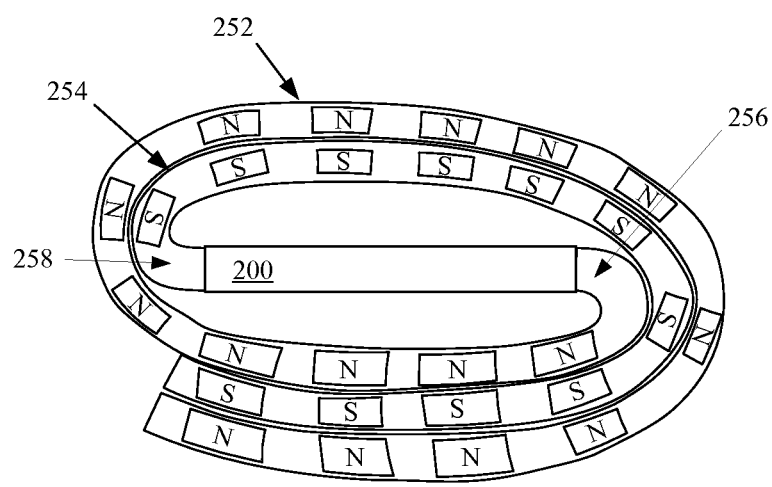

FIGS. 2A and 2B show cross sectional views of wrist-mountable device 200 and associated wristband 250. FIG. 2A shows a cross-sectional view of wrist-mountable device 200 in a wearable configuration. The depicted position shows the smallest possible size of depicted wrist-mountable device 200. As can be appreciated such a configuration provides the most secure attachment since a total of six pairs of magnets are in magnetic contact with one another. As wristband 250 expands fewer magnet pairs hold wrist straps 252 and 254 together. In some embodiments wrist strap 254 can be designed to be longer so that a wider range of users can wear the device. In other embodiments wrist strap 254 and 252 can be of equal length thereby making the device easier to switch between wrists. When a user is done wearing wrist-mountable device 200, FIG. 2B shows how it can be placed into a protective configuration. In this configuration wrist strap 254 can be wrapped in an opposite direction such that a portion of wrist strap 254 is surrounded by magnets disposed both above and below it as depicted. Wristband 250 can be flexible enough that portion 256 of wrist strap 254 and portion 258 of wrist strap 252 can bend sharply around wrist-mountable device 200 thereby wrapping wrist-mountable device tightly within wristband 250.

Figure 2C:
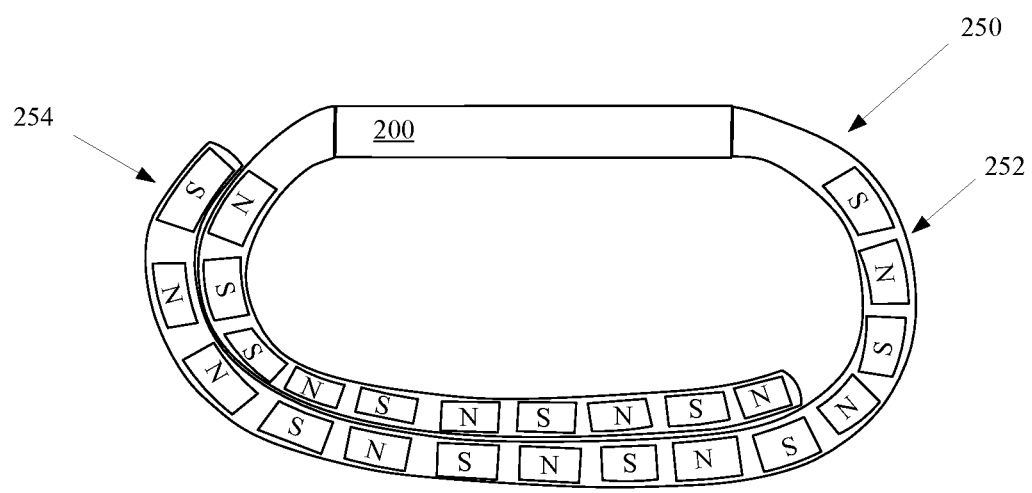
Figure 2D:
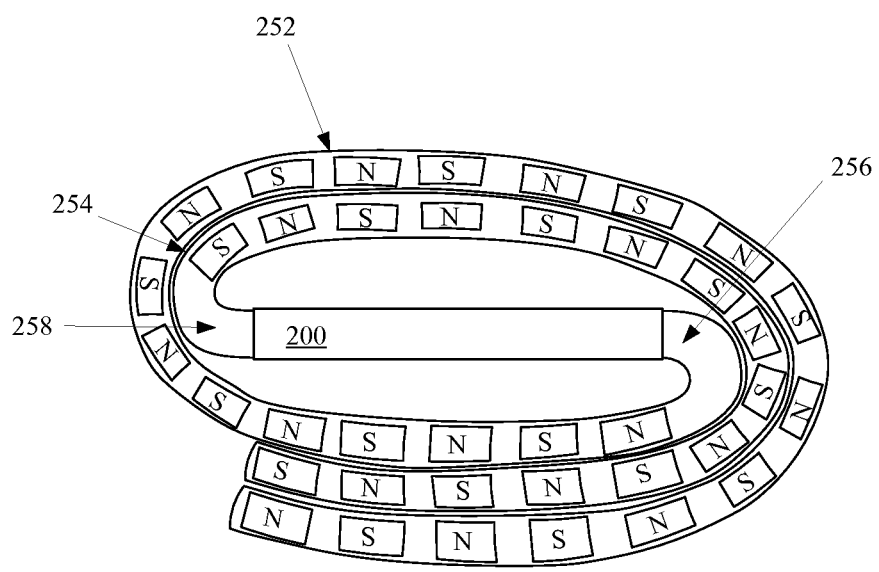

FIGS. 2C and 2D show an alternate magnet configuration in which the polarity of adjacent magnets alternate. Such a configuration can prevent slipping between wrist straps 252 and 254 as adjacent magnetic connections would tend to hold the wristband in one position. In one embodiment the embedded magnets can be narrower and/or spaced more closely together, thereby allowing for more wristband size adjustments to be realized while maintaining the enhanced locking power between the wrist straps. In other embodiments a N N S S configuration or, a N N S N N configuration are both possible. Any reversible pattern or palindrome (i.e. that reads the same forwards or backwards) can be utilized such that the wrist straps will attach securely to each other in both a wearable configuration and a protective configuration.

Figure 3A:
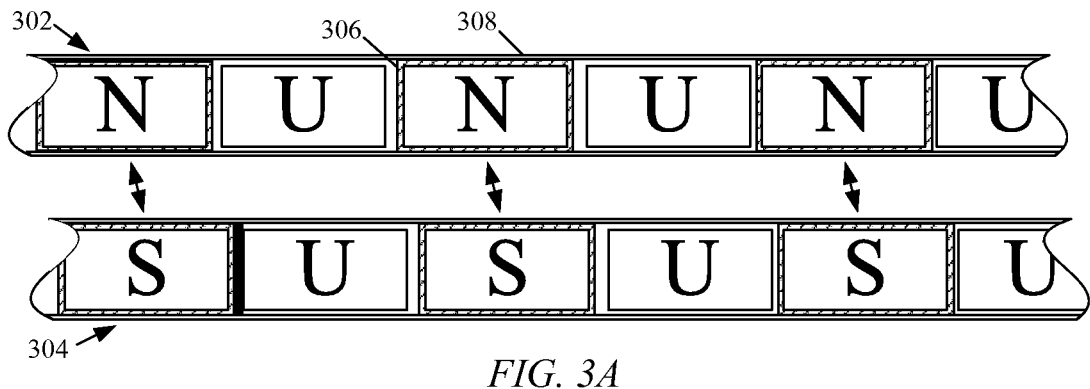
FIGS. 3A-3C show cross sectional views of a portion of each of two wrist straps.
Figure 3B:
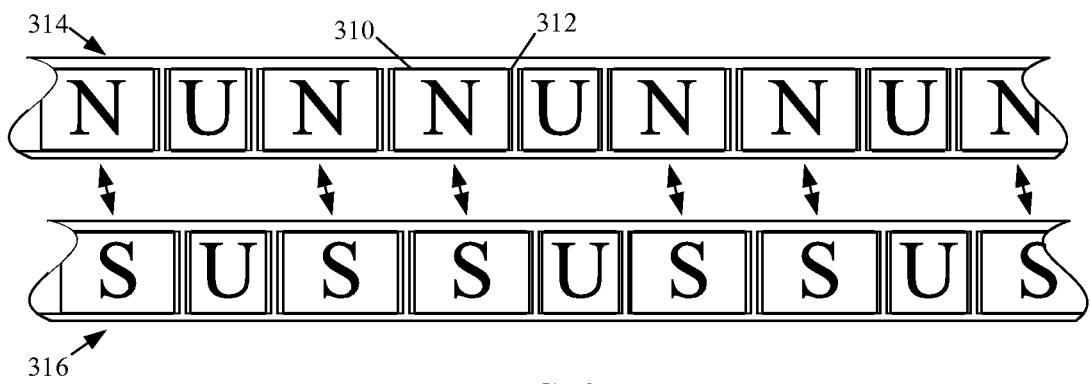
Figure 3C:
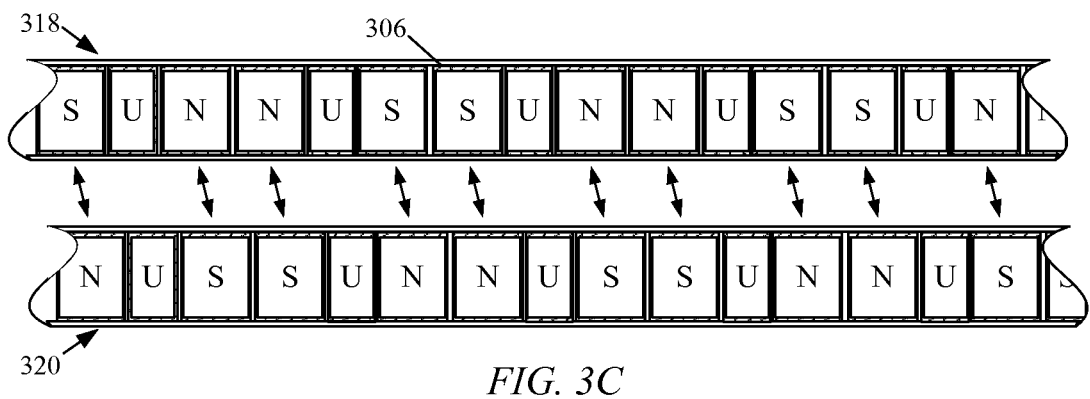

FIGS. 3A-3C show cross sectional views of a portion of each of two wrist straps. A number of different magnet configurations involving configurations with magnetically neutral elements are depicted. Magnetically neutral elements are indicated by the letter U in FIGS. 3A-3C. In some embodiments the magnetically neutral elements can be made of for example aluminum or plastic. The magnetically neutral elements can be utilized to provide a more consistent feeling around the wristband. Furthermore, since magnetic elements can be relatively expensive the magnetically neutral elements can be used in lieu of magnetic elements when sufficient adhesion strength can be achieved with fewer magnets, thereby reducing material prices. FIG. 3A shows wrist strap 302 and 304 configured in close proximity to one another with accompanying arrows between the two showing magnetic forces acting to pull the two wrist straps together. Also visible in FIG. 3A is a protective layer 306 disposed around a North polarized magnet. This protective layer 306 can be embodied as a thin layer of cushioning providing individual protection for the single magnet. Additionally, as discussed previously the wrist straps provide a certain amount of protection for the magnets. In one embodiment layer 308 of wrist strap 302 represents a layer of microfiber that encloses each magnet. In another embodiment layer 308 represents a layer of leather that encloses the magnetic elements. In yet another embodiment protective layer 306 can be coupled directly to layer 308, thereby keeping each magnetic element in place within the wristband.

FIG. 3B shows an alternative embodiment in which the magnets are arranged in a different polarity pattern. Each of the magnets can be held in place by a pocket arranged within the wrist strap. As depicted, magnet 310 lies within pocket 312 of wrist strap 314. When pocket 312 wraps tightly around magnet 310 a consistent position of magnet 310 within the wrist strap can be achieved. When wrist strap 314 is made of a micro fiber or fabric material pocket 312 can be sewn into wrist strap 314. In other embodiments partitions forming pocket 312 can be adhesively fixed within wrist strap 314. FIG. 3C shows yet another magnetic element arrangement. In this embodiment the magnetic elements have a narrower geometry allowing for more frequent repetition of the more complex pattern of N N U S S U N N. In this embodiment each of both the magnets and the magnetically neutral spacers are shown having protective layers 306 disposed around them such that each of wrist straps 318 and 320 have a consistent feel across a circumference of the wristband when worn.

Figure 4A:
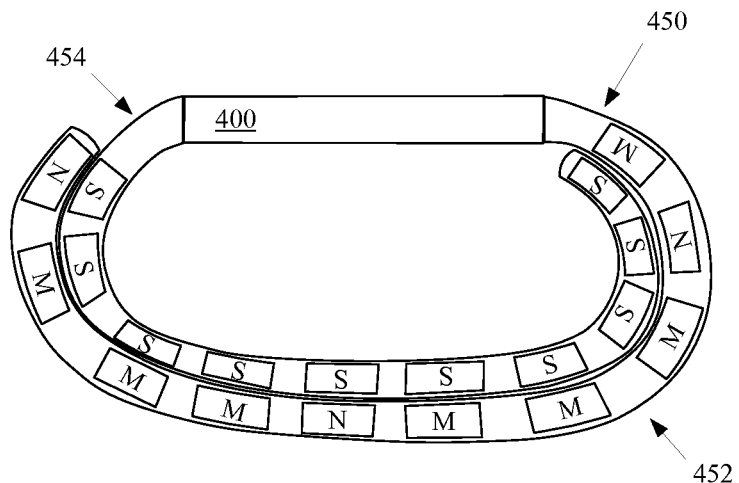
FIG. 4A shows a wrist-mountable device and wristband in which magnetic elements are mixed with magnetically attractable elements.
Figure 4B:
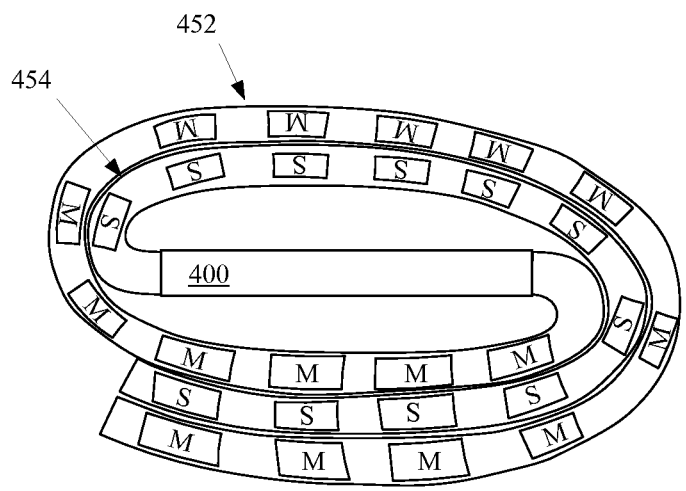
FIG. 4B shows a wristband having one wrist strap configured only with magnetically attractable elements and another wrist strap with magnets.

FIG. 4A shows a wrist-mountable device 400 and wristband 450 in which magnets are mixed with magnetically attractable elements. In FIG. 4A wristband 450 is depicted with wrist strap 452 and wrist strap 454. Wrist strap 452 is configured with a number of magnetically attractable elements, indicated by an M. In the depicted embodiment every fourth element is a north polarity magnet indicated by an N. By mixing magnets with magnetically attractable elements a reduction in a total number of magnets can be reduced while the remaining magnets can maintain strong connections in between certain portions of wrist strap 452 and 454. By using a couple of magnets in each wrist strap alignment between the wrist straps can be maintained thereby overcoming a problem associated with magnetically attractable element which do not automatically align the wrist straps as two magnets can. In other embodiments wrist strap 452 can be configured without any magnets and only magnetically attractable elements. While a connection between wrist strap 454 and 452 can be somewhat weaker in such a configuration an exterior layer of magnetically attractable elements can reduce the risk of inadvertent interference between magnetic fields emanating from wristband 450 and other magnetized objects such as for example credit cards. FIG. 4B shows that a wristband 450 with wrist strap 452 configured only with magnetically attractable elements can be configured to assume a protective configuration in which the straps coordinate to protect wrist-mountable device 400. Since wrist strap 454 with south polarized magnets are arranged between two portions of magnetically attractable strap 452, both portions of magnetically attractable strap 452 are magnetically coupled to wrist strap 452. In such a configuration the magnetically attractable elements can act as a shunt for the South polarized magnets, thereby helping to contain a magnetic field emanating from wrist strap 454. It should be noted that in some embodiments a wristband can include magnets, magnetically attractable elements and magnetically neutral elements.

Figure 5A:
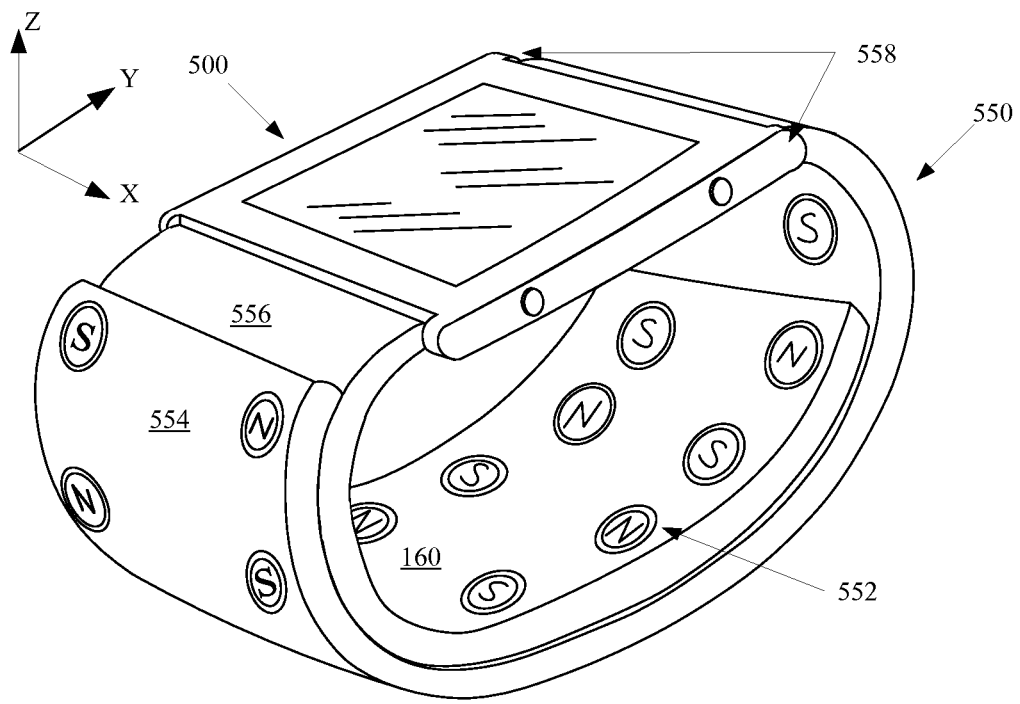
FIG. 5A shows an electronic device configured with a wristband in one wrapping configuration.
Figure 5B:
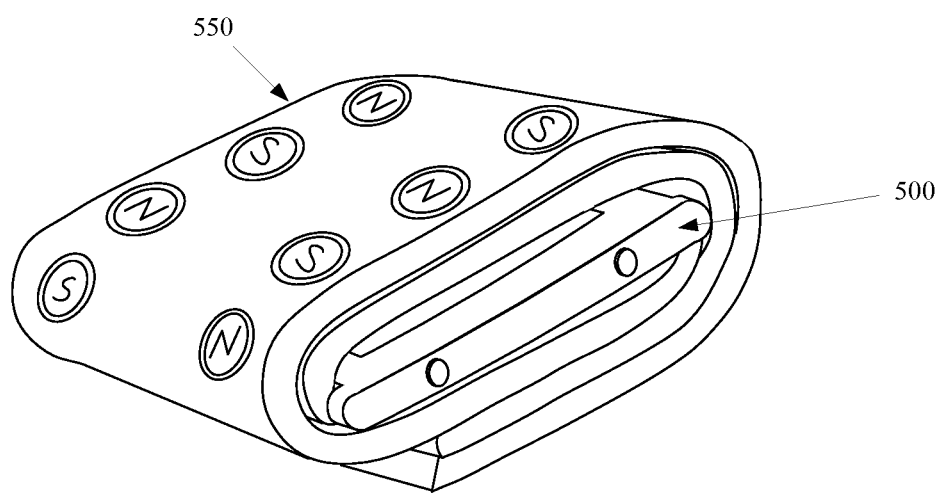
FIG. 5B shows an electronic device configured with a wristband in another wrapping configuration.
Figure 10:
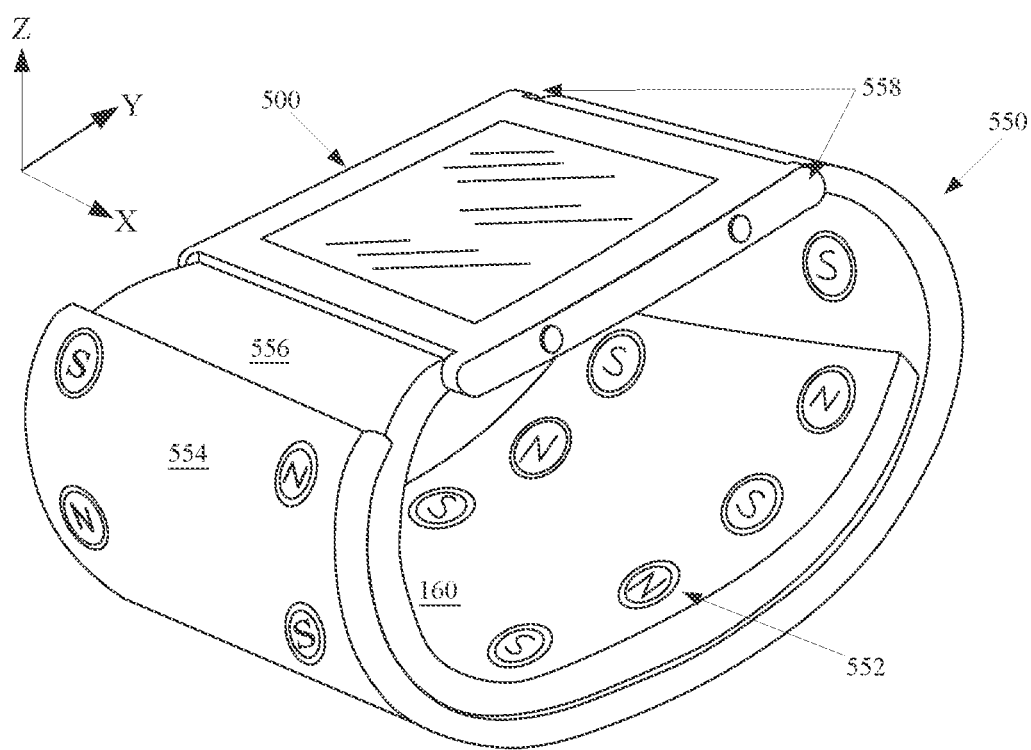
FIG. 10 shows another embodiment of the electronic device of FIG. 5A.

FIGS. 5A-5B show electronic device 500 configured with wristband 550 in both a first wrapping configuration and in a second wrapping configuration. FIG. 5A shows a first wrapping configuration in which pairs of ring magnets are used in lieu of a bar magnet. The ring magnets are disposed within wrist straps 554 and 556. As depicted a magnetic field associated with for example magnet 552 is aligned with the Z-axis as opposed to the embodiment from FIG. 1A in which each magnetic field is aligned along the X-axis. Precise alignment of wrist straps 554 and 556 can still be achieved due to the pair of magnets disposed within the wrist straps having opposing polarities. In one embodiment the magnets can be arranged in a repeating pattern in which polarities alternate between magnets as depicted. In other embodiments polarity patterns can be varied having polarity patterns similar to those depicted in FIGS. 2A-4B. Also illustrated in FIG. 5A are attachment points 558. Attachment points 558 can have a pin suspended between them such that wrist strap 554 can be rotatably coupled around the pin. In this way wrist straps 554 and 556 can freely rotate with respect to electronic device 500. FIG. 5B shows a second wrapping configuration in which wrist straps 556 and 554 cooperate to cover bottom and top surfaces of electronic device 500. In configurations where wristband 550 is thicker than an outer dimension of the electronic device (such as is shown in FIG. 10), protection for lateral portions of the electronic device can be achieved as well. For example, wider wristband embodiments can help to prevent inadvertent actuation of buttons disposed on lateral portions of the electronic device. It should be noted that in some embodiments sensitive electrical components disposed within the housing of electronic device 500 can be shielded in a way that prevents magnetic field energy from causing undue interference to the sensitive electrical components.

Figure 5C:
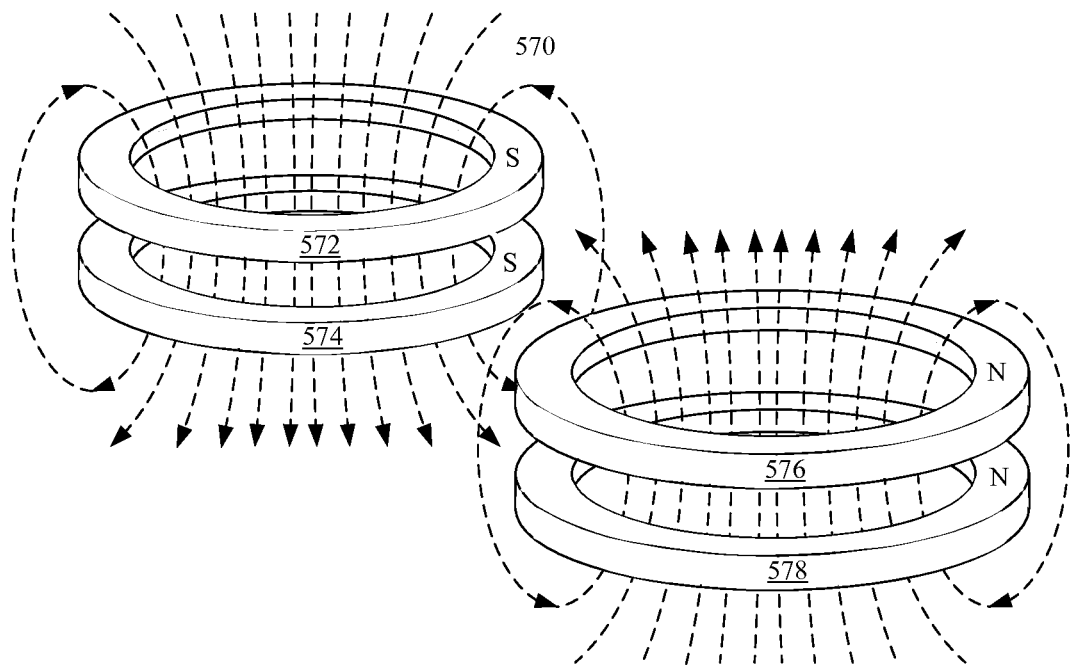
FIGS. 5C and 5D show a number of magnetic fields associated with ring magnets suitable for use in a magnetic wristband.
Figure 5D:
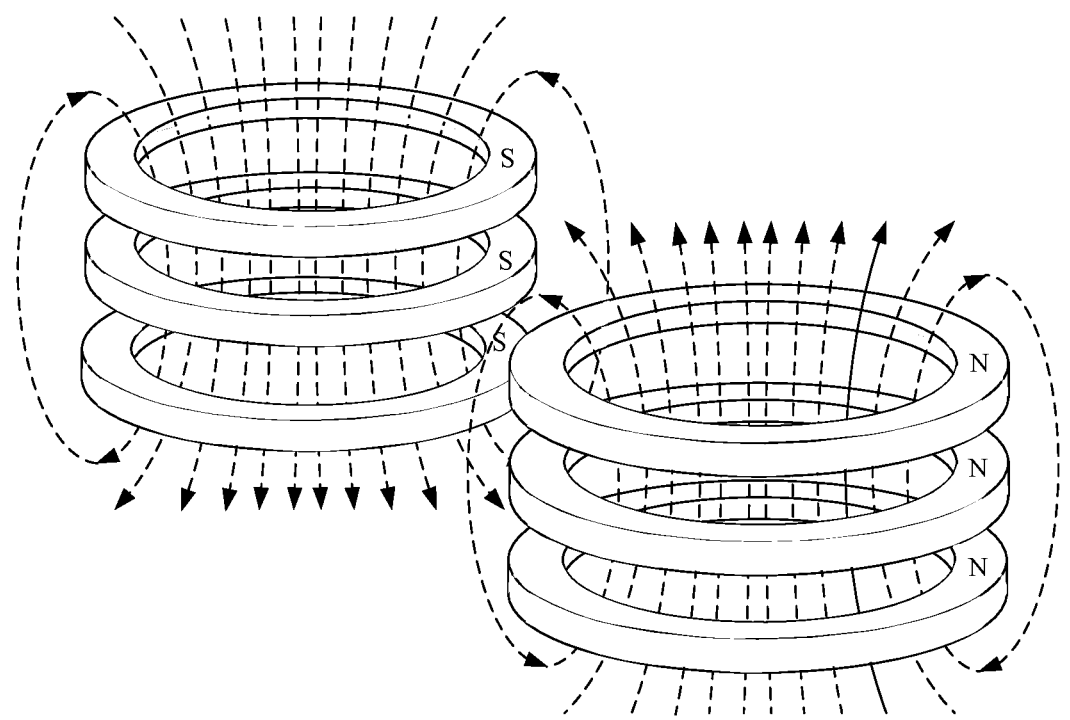

FIGS. 5C and 5D show magnetic fields associated with ring magnets. FIG. 5C shows a pair of ring magnets 572 and 574 in a configuration typically associated with the first wrapping configuration depicted in FIG. 5A. Magnetic field 570 runs through a center portion of ring magnets 572 and 574, thereby supplying an attractive magnetic force tending to couple the two ring magnets together. Since magnetic fields of magnets 576 and 578 are oriented in a direction opposite magnets 572 and 574, there is no risk of for example ring magnet 578 being attracted to ring magnet 572. FIG. 5D similarly shows a vertical stack of three magnets with associated magnetic fields passing through central portions of the magnets. FIG. 5D is representative of a configuration of magnets at a bottom portion of the wristband in the second wrapping configuration, specifically at the point where wrist strap 554 is magnetically coupled to both sides of wrist strap 556.

Figure 6:
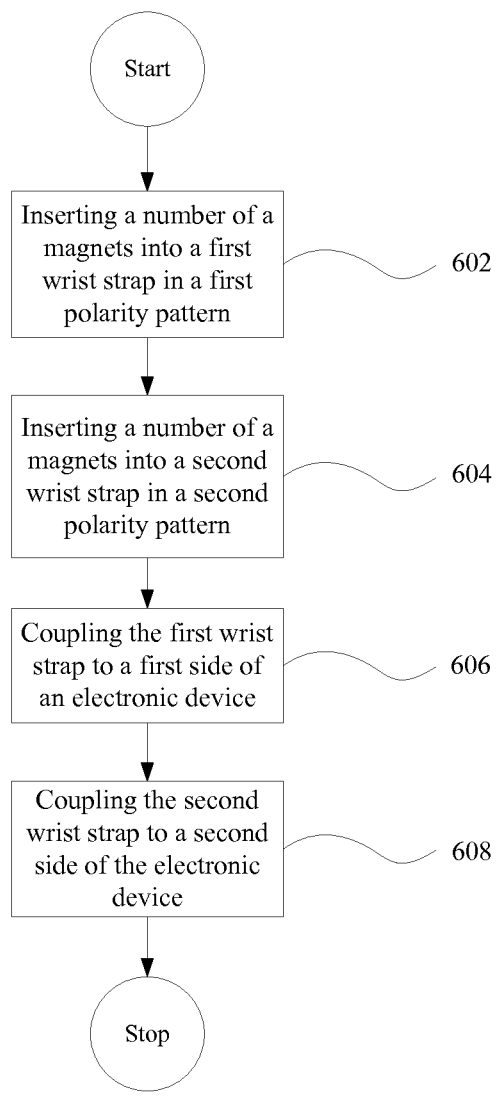
FIG. 6 shows a block diagram describing a process for assembling a magnetic wristband and attaching it to an electronic device.

FIG. 6 shows a block diagram describing process 600 for assembling a magnetic wristband and attaching it to an electronic device. In step 602 a number of magnets are inserted into a first wrist strap. The magnets are inserted in accordance with a first polarity pattern. The polarity pattern determines the magnetic orientation of a magnetic field associated with each of the inserted magnets. In some embodiments the polarity pattern of the inserted magnets is configured such that magnetic field orientations of adjacent magnets are the same. In other embodiments, magnetic field orientations can be alternating such that magnetic field orientations between adjacent magnets are oriented opposite one another. The first wrist strap can be configured to maintain adjacent magnets at a set spacing interval. In step 504 a number of magnets are inserted into a second wrist strap. Similar to step 502 the magnets are arranged within the second wrist strap having a second polarity pattern. The second polarity pattern is configured to be opposite the first polarity pattern, thereby causing the first and second wrist strap to attract to each other. Furthermore the polarity patterns are palindrome patterns allowing the polarity patterns to match up whether disposed against one another on a first surface of a wrist strap or a second surface of a wrist strap. In step 506 a first end of the first wrist strap is coupled to a first side of an electronic device. The coupling can be a mechanical coupling. In one embodiment a hole is disposed through one end of the wrist strap that can be attached to the electronic device by a pin, thereby allowing the first wrist strap to freely rotate with respect to the electronic device. In another embodiment the first end can be clamped by a clamping mechanism portion of the electronic device. It should be noted that any secure mechanical coupling can be used to couple the wrist straps to the device. In step 508 a first end of the second wrist strap is coupled to a second side of the electronic device. This allows the first and second wrist straps to form a magnetic wristband allowing the electronic device to be attached to a wrist of a user. The magnetic wristband is also operable to act as a protective cover for the electronic device when a user is not wearing it.

Figure 7:
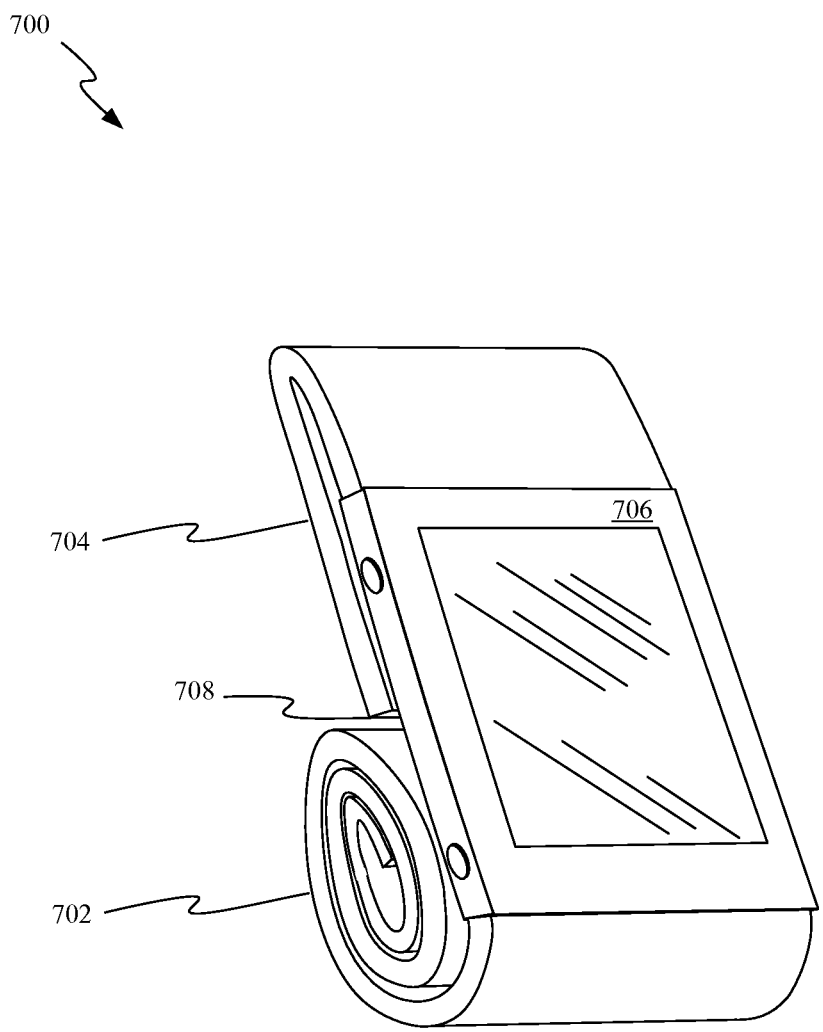
FIG. 7 shows a magnetic wrist-band configured to display a wrist-mountable device at a convenient viewing angle.

FIG. 7 shows a magnetic wristband coupled to a wrist-mountable device. The magnetic wristband includes at least magnetic wrist strap 702 and 704. In one embodiment magnetic wrist strap 702 can be configured with magnets in a configuration similar to the configuration shown in FIG. 4B. By rolling magnetic strap 702 up as depicted the magnetic wrist strap can be used as a stand to prop wrist-mountable device 706 at a convenient viewing angle. Magnetic strap 702 can maintain a secure configuration since magnets within magnetic strap 702 can be attracted to one another. Magnetic strap 704 can have magnetically attractable elements disposed within it, causing at least end 708 of magnetic strap 708 to be magnetically attracted to magnetic strap 702. In this way magnetic straps 702 and 704 can be neatly stowed behind wrist-mountable device 706, while displaying wrist-mountable device 706 at a convenient viewing angle.

Figure 8:
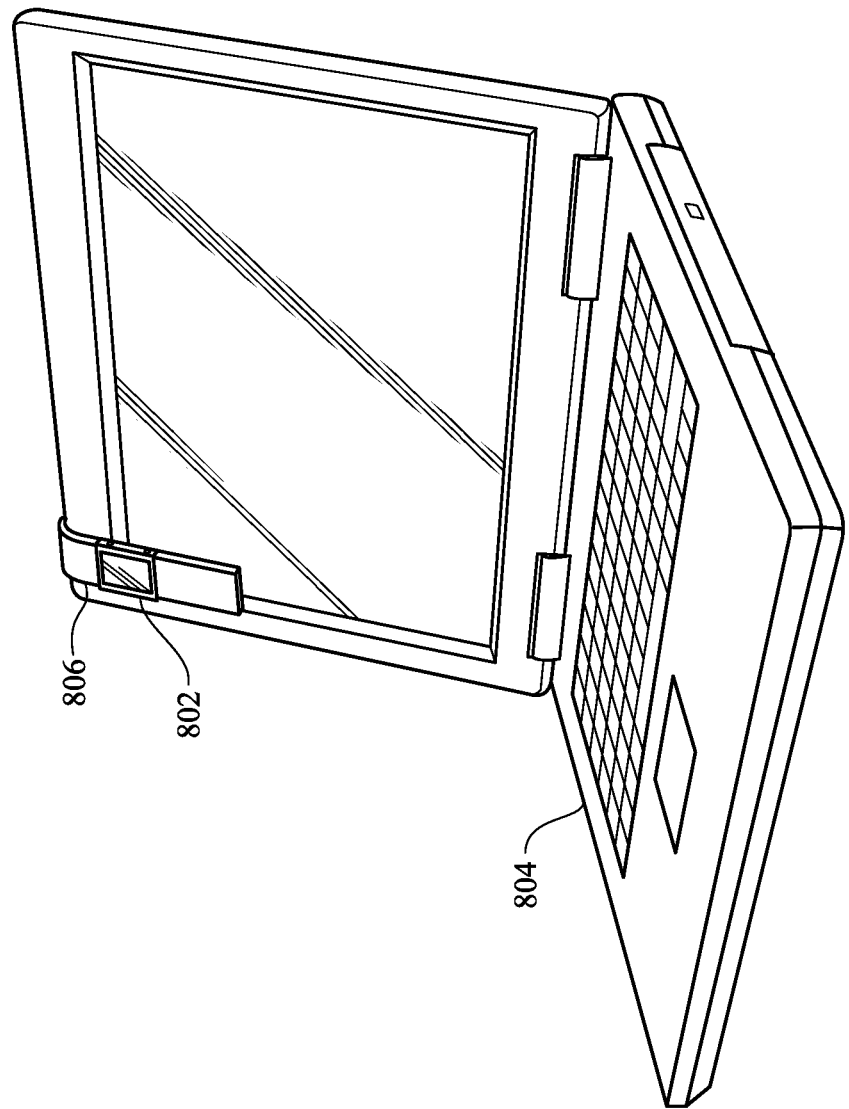
FIG. 8 shows how a magnetic wristband can be configured to attach a wrist-mountable device to a portable electronic computing device.

FIG. 8 shows a portable electronic computing device. Wrist-mountable device 802 can be magnetically coupled to portable electronic computing device 804 in a number of ways. When wrist-mountable device 802 is coupled to magnetic wrist straps, the magnetic wrist straps can be magnetically coupled to a magnetically attractable portion of portable electronic computing device 804. Alternatively, a magnetically attracable clip 806 can be coupled to portable electronic device 804, allowing magnetic elements within wrist straps associated with magnetically attractable device 802 to be securely coupled to it. Such a configuration can be highly desirable when wrist-mountable device 802 is in communication with portable electronic computing device 804. For example, wrist-mountable device 802 can be wireless communication with portable electronic computing device 804 via any number of wireless protocols such as WiFi, Bluetooth, or any other protocol capable of at least one way communication. In a connected state wrist-mountable device 802 can be configured to display critical alerts or information to a user. Alternatively, a information sync can be accomplished between the two devices.

Figure 9A:
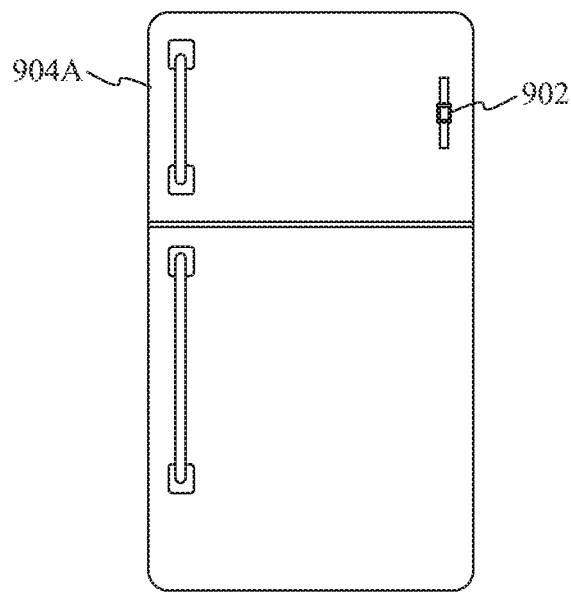
FIGS. 9A-9B show a number of ways in which a wrist-mountable device can be magnetically coupled to other devices.
Figure 9B:
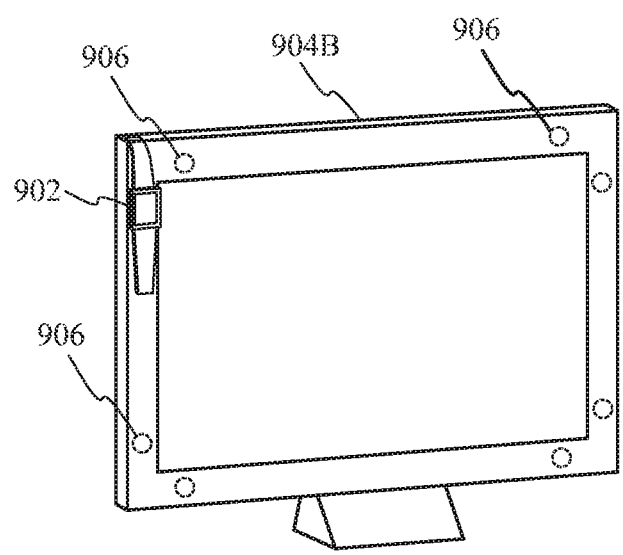

FIGS. 9A and 9B show various other ways in which a wrist-mountable device can be conveniently positioned through the use of a magnetic wristband. In FIG. 9A wrist-mountable device 902 can be magnetically attracted to refrigerator 904A. Such a configuration can be desirable when a user of the wrist-mountable device doesn't wish to be wearing the device but still wants convenient access to it. In a kitchen, for example, a user could utilize such a device as a timer or convenient way to browse a certain recipe that was stored on wrist-mountable device 902. In FIG. 9B, wrist-mountable device 902 is shown magnetically coupled to computing device 904B. Computing device 904B can be configured with a number of magnets 906. In one embodiment magnets 906 can be generally configured to couple a sheet of cover glass to a front portion of the display. In such a configuration, wrist-mountable device 902 can be configured to be magnetically attracted to those same magnets to securely couple the device to computing device 904B. In such a position, as discussed in FIG. 8, wrist-mountable device can be configured to interact with computing device 904B.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A magnetic band for a wristwatch, the magnetic band comprising:
 a first layer;
 a second layer;
 pockets defined between the first layer and the second layer; and
 magnets;
 wherein the magnetic band is configurable to:
  extend from one side of the wristwatch; and
  maintain a secure configuration in which the magnets are attracted to one another while the magnetic band is folded onto itself;
 wherein, when the magnetic band is fully extended on a flat surface, the magnets are arranged within the pockets and in multiple rows and columns such that:
  a first adjacent pair of the magnets, within one of the rows, have magnetic polarity orientations, defined by north-south polarization direction, that are opposite one another; and
  a second adjacent pair of the magnets, within one of the columns, have magnetic polarity orientations that are opposite one another.

2. The magnetic band of claim 1, wherein the pockets form separations between each of the magnets.

3. The magnetic band of claim 1, further comprising: an end connectable to the wristwatch.

4. The magnetic band of claim 1, wherein the first layer and the second layer each comprise a leather layer.

5. A wristwatch, comprising:
 a housing;
 an attachment point coupled to the housing; and
 a strap, releasably coupled to the attachment point, comprising:
  a first cover;
  a second cover, the first and second covers defining pockets; and
  magnets positioned in an alternating polarity pattern within the pockets, wherein the magnets are arranged in multiple rows and columns such that, when the strap is fully extended on a flat surface, at least two of the magnets within one of the rows have alternating magnetic polarity orientations, defined by north-south polarization direction, and at least two of the magnets within one of the columns have alternating magnetic polarity orientations.

6. The wristwatch of claim 5, wherein the magnets comprise bar magnets.

7. The wristwatch of claim 6, wherein each of the bar magnets are disposed longwise perpendicular to a longwise dimension of the strap.

8. The wristwatch of claim 5, wherein:
each magnet of the magnets has a polarity pattern; and polarity patterns of adjacent magnets alternate.

9. The wristwatch of claim 5, wherein:
each magnet of the magnets has a polarity pattern; and the polarity pattern comprises a first polarity pattern and a second polarity pattern that is opposite the first polarity pattern.

10. The wristwatch of claim 5, wherein the attachment point comprises a clamping mechanism.

11. The wristwatch of claim 5, further comprising:
an additional attachment point coupled to the housing; and
an additional strap coupled to the additional attachment point.

12. A magnetic band for a wristwatch, comprising:
a first strap comprising:
  magnets within in the first strap and having an alternating polarity pattern in which, when the first strap is fully extended on a flat surface, a given one of the magnets has a magnetic polarity orientation, defined by north-south polarization direction, that is:
    different than a magnetic polarity orientation of a first adjacent magnet in a same row as the given one of the magnets; and
    different than a magnetic field orientation of a second adjacent magnet in a same column as the given one of the magnets; and
  protective layers that enclose and protect the magnets, wherein the magnetic band is configurable to extend from a side of the wristwatch and maintain a secure configuration in which the magnets are attracted to one another while the magnetic band is rolled onto itself; and
a second strap opposite the first strap.

13. The magnetic band of claim 12, wherein the magnets are operable to lock the magnetic band in a rolled configuration where a first portion of the first strap attaches to a second portion of the first strap.

14. The magnetic band of claim 12, wherein the protective layers maintain the magnets at a set spacing interval.

15. The magnetic band of claim 12, wherein the alternating polarity pattern is configured such that magnetic polarity orientations of adjacent magnets alternate.

16. The magnetic band of claim 12, wherein the magnetic band is configured to adjust a wristband size.

* * * * *